(12) United States Patent
Jana et al.

(10) Patent No.: US 9,549,003 B2
(45) Date of Patent: Jan. 17, 2017

(54) PROTOCOL TRANSLATIONS FOR INTERNET SERVICES

(71) Applicant: AT&T Intellectual Property I, L.P., Atlanta, GA (US)

(72) Inventors: Rittwik Jana, Parsippany, NJ (US); John F. Murray, Denville, NJ (US); Christopher W. Rice, Parsippany, NJ (US); Ron Shacham, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 47 days.

(21) Appl. No.: 14/568,144

(22) Filed: Dec. 12, 2014

(65) Prior Publication Data
US 2015/0092769 A1 Apr. 2, 2015

Related U.S. Application Data

(63) Continuation of application No. 13/901,609, filed on May 24, 2013, now Pat. No. 8,937,972, which is a continuation of application No. 12/339,901, filed on Dec. 19, 2008, now Pat. No. 8,467,306.

(51) Int. Cl.
*H04L 12/66* (2006.01)
*H04L 29/06* (2006.01)
*H04L 12/28* (2006.01)

(52) U.S. Cl.
CPC ........... *H04L 65/1069* (2013.01); *H04L 12/66* (2013.01)

(58) Field of Classification Search
CPC .. H04L 65/10; H04L 65/1003; H04L 65/1016; H04L 65/102; H04L 65/1033; H04L 65/1066; H04L 65/1069; H04L 65/1006
See application file for complete search history.

(56) References Cited

U.S. PATENT DOCUMENTS

| | | | |
|---|---|---|---|
| 7,006,436 | B1 | 2/2006 | Chu et al. |
| 7,016,341 | B2 | 3/2006 | Potter et al. |
| 7,035,248 | B2 | 4/2006 | Wengrovitz |
| 7,203,166 | B1 | 4/2007 | Chu et al. |
| 7,307,963 | B2 | 12/2007 | Chow et al. |
| 7,406,043 | B1 | 7/2008 | Chu et al. |
| 7,457,638 | B2 | 11/2008 | Dhillon et al. |
| 7,581,166 | B2 | 8/2009 | Renger et al. |
| 7,676,229 | B2 | 3/2010 | Albina et al. |
| 7,899,168 | B2 | 3/2011 | Raghav et al. |

(Continued)

OTHER PUBLICATIONS

Khilfi, H. and Gregoire, J_C., IMS for Enterprises, IEEE Communications Magazine, Jul. 2007, pp. 68-75, vol. 45 Issue:7.

*Primary Examiner* — Ahmed Elallam
(74) *Attorney, Agent, or Firm* — Scott P. Zimmerman, PLLC

(57) ABSTRACT

An Internet protocol Multimedia Subsystem (IMS) gateway application server includes an originating application server module adapted to invoke call control services in response to requests initiated by a voice over Internet Protocol (IP) (VoIP) client associated with a communication device such as an IP telephone. Disclosed gateway application servers include a proxy server module adapted to notify the communication client of session control messages intended for the communication device.

20 Claims, 6 Drawing Sheets

(56) References Cited

U.S. PATENT DOCUMENTS

| | | | |
|---|---|---|---|
| 7,912,963 B2 | 3/2011 | Jackson | |
| 8,396,973 B2 | 3/2013 | Wang | |
| 8,467,306 B2* | 6/2013 | Jana | H04L 65/1069 370/252 |
| 8,937,972 B2* | 1/2015 | Jana | H04L 65/1069 370/352 |
| 9,398,160 B2* | 7/2016 | Rist | H04L 29/06027 |
| 2002/0110113 A1* | 8/2002 | Wengrovitz | H04L 65/1069 370/352 |
| 2003/0053434 A1 | 3/2003 | Chow et al. | |
| 2003/0058827 A1 | 3/2003 | Chow et al. | |
| 2003/0095542 A1* | 5/2003 | Chang | H04M 7/0057 370/352 |
| 2003/0215080 A1 | 11/2003 | Wengrovitz | |
| 2004/0062271 A1 | 4/2004 | Oliver et al. | |
| 2004/0179668 A1 | 9/2004 | Gilbert et al. | |
| 2004/0228328 A1* | 11/2004 | Potter | H04L 29/06 370/352 |
| 2005/0114524 A1 | 5/2005 | Tiruthani | |
| 2005/0123117 A1 | 6/2005 | Stockdale | |
| 2005/0141691 A1 | 6/2005 | Wengrovitz | |
| 2005/0198147 A1 | 9/2005 | Pastro et al. | |
| 2006/0101146 A1* | 5/2006 | Wang | H04L 29/06027 709/227 |
| 2006/0117040 A1 | 6/2006 | Begeja et al. | |
| 2006/0133349 A1* | 6/2006 | Kan | H04M 3/5191 370/352 |
| 2006/0258394 A1 | 11/2006 | Dhillon et al. | |
| 2007/0036144 A1 | 2/2007 | Raghav et al. | |
| 2007/0121596 A1 | 5/2007 | Kurapati et al. | |
| 2007/0201665 A1 | 8/2007 | Kocan et al. | |
| 2007/0275710 A1 | 11/2007 | Mayer et al. | |
| 2008/0008150 A1 | 1/2008 | Chow et al. | |
| 2008/0021963 A1 | 1/2008 | Jana et al. | |
| 2008/0021976 A1 | 1/2008 | Chen et al. | |
| 2008/0034056 A1 | 2/2008 | Renger et al. | |
| 2008/0043690 A1 | 2/2008 | Chow et al. | |
| 2008/0043691 A1 | 2/2008 | Chow et al. | |
| 2008/0075055 A1 | 3/2008 | Chow et al. | |
| 2008/0086564 A1 | 4/2008 | Putman et al. | |
| 2008/0137643 A1 | 6/2008 | Khanchandani et al. | |
| 2008/0305794 A1 | 12/2008 | Mukaiyama et al. | |
| 2009/0110160 A1 | 4/2009 | Kucmerowski et al. | |
| 2009/0168985 A1 | 7/2009 | Yu et al. | |
| 2009/0181657 A1* | 7/2009 | Ramanathan | H04M 1/2535 455/415 |
| 2009/0234862 A9 | 9/2009 | Begeja et al. | |
| 2009/0261943 A1 | 10/2009 | Jana et al. | |
| 2009/0276503 A1 | 11/2009 | Renger et al. | |
| 2010/0002626 A1 | 1/2010 | Schmidt et al. | |
| 2010/0002661 A1 | 1/2010 | Schmidt et al. | |
| 2010/0002662 A1 | 1/2010 | Schmidt et al. | |
| 2010/0014494 A1 | 1/2010 | Schmidt et al. | |
| 2010/0056120 A1 | 3/2010 | Olrog et al. | |
| 2010/0058403 A1 | 3/2010 | Ramaswami et al. | |
| 2010/0290453 A1 | 11/2010 | Rist et al. | |
| 2011/0090823 A1 | 4/2011 | Silver | |

* cited by examiner

PROTOCOL TRANSLATIONS FOR INTERNET SERVICES

CROSS-REFERENCE TO RELATED APPLICATIONS

This application is a continuation of U.S. application Ser. No. 13/901,609 filed May 24, 2013 and since issued as U.S. Pat. No. 8,937,972, which is a continuation of U.S. application Ser. No. 12/339,901 filed Dec. 19, 2008 and since issued as U.S. Pat. No. 8,467,306, with both applications incorporated herein by reference in their entireties.

BACKGROUND

Field of the Disclosure

The present disclosure generally relates to blending telephony services with an Internet protocol multimedia subsystem using a gateway.

Description of the Related Art

Feature servers provide services such as call waiting and voicemail to Internet protocol (IP) multimedia subsystem (IMS) networks. Gateways that communicate between communication servers and IMS networks may have to use proprietary protocols to utilize advanced services provided by feature servers.

DESCRIPTION OF EXEMPLARY EMBODIMENTS

Figure 1:
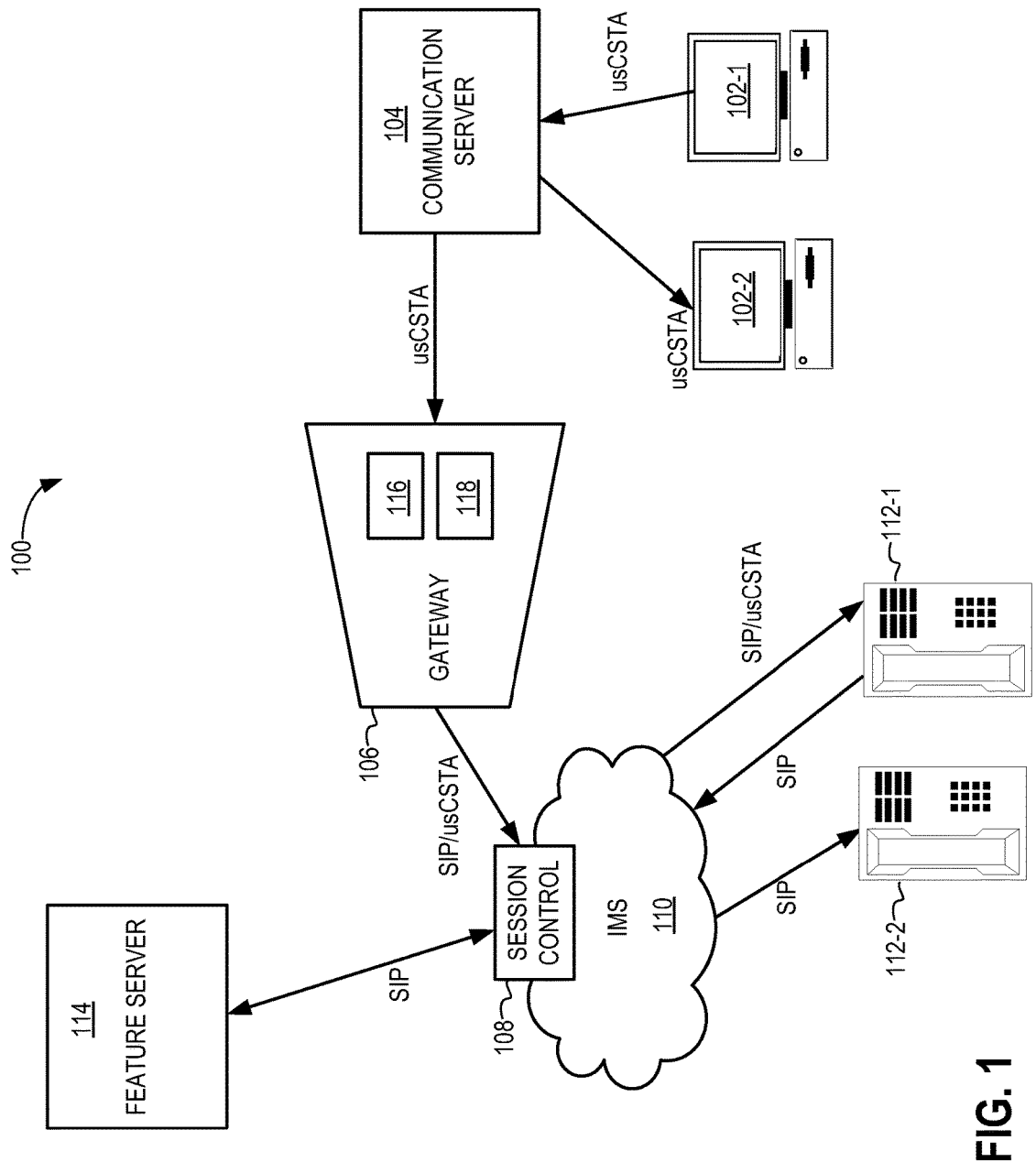
FIG. 1 depicts an exemplary communication system in which a communication server communicates with components of an IMS network through an embodied gateway.

In one aspect, a disclosed gateway functions as an application server and communicates with an IMS network through a session control unit. The gateway application server processes communication interactions between a communication server and the session control unit, which may be a serving-call session control function (S-CSCF). The gateway application server invokes call control services between a communicator client (e.g., a communication software program on a personal computer) and a communication device (e.g., a telephone) and exchanges IMS session control messages. Example call control services that may be invoked include "make call" and "hold call" services. One or more feature servers are communicatively coupled to or otherwise configured to communicate with the IMS network through the session control unit. The gateway processes call requests from the communication server to the IMS network and monitors and communicates with communication devices (e.g., telephones) that are associated with the communicator client.

In some embodiments of the gateway, the session control unit may selectively suppress message forwarding from the communication server to the IMS network for messages that meet predetermined criteria. The gateway may send call control requests from the communicator client to the communication device (e.g., a mobile telephone or a landline telephone) and, as a gateway application server, determine if the communication device supports a user agent Computer Supported Telecommunications Applications (uaCSTA) protocol. If the communication device does not support the uaCSTA protocol, the gateway translates uaCSTA protocol messages to Session Initiation Protocol (SIP) compliant messages for the communication device. In some embodiments, the gateway further functions as a proxy application server by monitoring calls made within the IMS network and providing indications of call requests to the communication server.

In another aspect, a computer program product stored on a tangible media includes instructions for providing an IMS network with services from a feature server. Instructions invoke call control services between a communicator client and a communication device (such as a server), process communication session interactions between the communication server and a session control unit, and exchange IMS session control messages between the session control unit and the communication server. In some embodiments, further instructions process call requests from the communication server to the IMS network, monitor call activity of the communication device, suppress message forwarding from the communication server to the IMS network for messages that meet predetermined criteria, and send call control requests from the communicator client to the communication device. Further instructions enable a gateway to determine whether the communication device supports a uaCSTA protocol, and if necessary, translate uaCSTA protocol messages to SIP compliant messages for the communication device.

In still another aspect, a disclosed IMS gateway application server (GAS) includes an originating application server (OAS) module that invokes call control services in response to requests initiated by a voice over IP (VoIP) client associated with a user to an IP telephone associated with the user. The GAS further includes a proxy server module adapted to notify the communicator client of session control messages intended for the communication device. In some embodiments, the GAS is communicatively coupled to a communication server and processes communication session interactions between the communication server and a call session controller.

Advanced feature servers are used with enterprise IP telephony systems to provide traditional services such as call hold, voicemail and find-me-follow-me. These feature servers can be deployed as IMS application servers to support both in-house (premises based) or hosted service (IP Centrex) offerings. In some cases, applications that are external to IMS can provide, when integrated, an improved communications experience. The application layer in IMS allows these external applications to be blended with the advanced telephony features. An example of this is the use of Microsoft™ Office Communicator™ (hereinafter "Communicator") for call control. Such features are commonly implemented using back-end proprietary interfaces to specific feature servers. Disclosed embodiments utilize architectures that provide for integration and communication between CSTA/IMS gateways and IMS feature servers without the need for such proprietary interfaces.

Complexities associated with managing and supporting a mixture of wireline and wireless technologies, including converged enterprise VoIP services, present challenges for telephone service providers. IMS systems provide advanced network architectures for mobile and fixed multimedia services. IMS is standardized by the 3rd Generation Partnership Project (3GPP). IMS is intended as a scalable integrated platform that enables new services and provides for the combination of telecommunications and Internet services. To promote integration with Internet, IMS may use Internet Engineering Task Force (IETF) protocols (i.e., Internet protocols) such as SIP.

IMS supports the convergence of applications to create advanced multimedia services and supports the provisioning of applications across diverse access networks including wireline and wireless networks. IMS separates the application and service layer from the switching and control layer, which is in turn separated from the connectivity and transport layer. IMS can be used as a common framework for linking together enterprise applications with telecommunications services.

An example of an enterprise application linked with telecommunication services is Microsoft™ Live Communications Server™ (hereinafter "LCS") and Communicator, which integrates with software suites (e.g., Microsoft Office™) and provides instant messaging (IM), voice information, and presence information in an interface familiar to users of Microsoft™ products. In some cases, remote control and monitoring of IP telephones, which may be part of an IMS infrastructure, is available from Communicator.

Disclosed embodiments include generic IMS gateways and may benefit various types of communication networks including standalone enterprise IMS systems connected to a provider network, fully hosted IMS-centrex systems, and IMS-centrex systems with the application servers managed by enterprises.

Disclosed systems may determine whether telephones and other communication devices are uaCSTA protocol compatible. The uaCSTA protocol is used for remotely controlling and observing call activity on telephones. It is standardized by ECMA International. Messages may be in an XML format, based on the ECMA-323 standard, and may be sent in the body of SIP INFO messages, for example. Messages in the uaCSTA protocol are sent, for example, between a personal computer (PC) application and a uaCSTA enabled device. Such uaCSTA enabled devices may be telephones, or other entities that logically represent telephones. Messages are typically either call control services or call control events. Call control services include actions executed on the telephone, such as "Make Call" or "Hold Call." Call control events include events that occur on the telephone, such as a call being received, and are subscribed to by an application when it creates an ongoing monitor of a telephone.

Some communications systems integrate the uaCSTA protocol to permit interfaces within software suites (e.g., Microsoft Office™) to interface with traditional telephony equipment. Applications such as Communicator act with LCS to route messages between Communicator (i.e., a client) and uaCSTA devices (e.g., uaCSTA enabled telephones). The uaCSTA protocol may be supported on telephones as an additional firmware layer. In such cases, the telephone itself acts as the uaCSTA device. Otherwise, a gateway may be required to provide status information about the telephone and to control it through non-uaCSTA means (e.g., through ordinary SIP interactions).

When applications such as Communicator interact with devices in an IMS, a communication server application such as LCS must interact with a gateway to the IMS, since it is not positioned to connect directly to the IMS. In accordance with disclosed embodiments, the gateway acts as an IMS application server and performs two essential functions. First, for devices that do not support the uaCSTA protocol natively, the gateway translates the uaCSTA protocol to SIP signaling. Specifically, for call control services, the gateway uses SIP methods to execute the desired services on the device. For call control events, the gateway monitors the SIP-signaling to and from the device, acting as a proxy server. Second, even for devices that support uaCSTA, the gateway adds IMS headers before sending messages into the IMS core.

In traditional systems, communications server applications such as LCS may be integrated with advanced call control features, including but not limited to, making calls, answering incoming calls, real-time forwarding of calls, and conferencing. Additionally, devices (e.g., telephones) may be monitored to notify a communication client (e.g., Communicator) when a call is being received or terminated. The routing of requests may be monitored and requests may be influenced based on presence information provided by the communication client. For example, when a "Do Not Disturb" setting is enabled in a communication client (e.g., Communicator), an associated telephone will not ring. In many cases, these solutions are achieved using a gateway that sits directly between the LCS server and the feature server and the gateway communicates through a proprietary protocol. Such approaches may not be ideal from a hosted service provider's point of view. When an enterprise with an existing IP-based infrastructure transitions to a hosted environment, it may be desirable for them to continue to use the same feature server to promote providing the same services and promote the system having the same feel for users. Supporting a new feature server using traditional systems with a gateway that is between the LCS server and the feature server and that communicates through a proprietary protocol may require that a separate gateway is available. Furthermore, the communication server application (e.g., LCS) must be aware of the feature servers assigned to specific subscribers in the IMS to route uaCSTA messages to the correct gateway associated with that feature server. This requires an undesired duplication of data.

Disclosed embodiments break up the feature server functionality into two separate application servers which are the uaCSTA/IMS gateway and the existing feature server. There may be multiple feature servers and there is a one-to-many relationship between the gateway and feature servers. All uaCSTA interactions are handled by the gateway. Embodied gateways initiate call-control requests from communication clients (e.g., Communicator) in the IMS and monitor call activity of telephones with associated communication clients. The feature server remains in the signaling path for all communications between IMS clients and executes services such as music on hold, find-me-follow-me, and voicemail.

Reference is now made to the figures. When describing the figures in this disclosure, a hyphenated form of a reference numeral typically refers to a specific instance of an element and the un-hyphenated form of the reference numeral typically refers to the element generically or collectively. Thus, for example, widget 12-1 refers to an instance of a widget class, which may be referred to collectively as widgets 12, and any one of which may be referred to generically as a widget 12.

FIG. 1 illustrates an exemplary architecture 100 for blending telephony services with IMS network 110. As shown, gateway 106, through application server 116, functions as an originating application server to invoke call control services. For example, when a "Make Call" request is sent by communication client 102-1, gateway 106 sends a request to telephone 112-1 through session control unit 108. To know how to continue this service invocation, gateway 106 determines or assesses whether telephone 112-1 supports uaCSTA. Gateway 106 may determine this by sending a uaCSTA request and waiting to see whether telephone 112-1 recognizes it and responds to it.

Additionally, gateway 106 may determine if telephone 112-2 recognizes uaCSTA commands by sending a uaCSTA compatible message and waiting for a response. For example, a MakeCall request may be sent to telephone 112-2 and, if telephone 112-2 supports uaCSTA, a response message will be received by gateway 106. In some disclosed embodiments, IMS-related headers are added before sending requests to communication devices such as telephones 112. If a telephone (e.g., telephone 112-1) does not support uaCSTA, gateway 106 carries out the call control request by sending a SIP INVITE request to the telephone, followed by a SIP REFER request, prompting the telephone (e.g., telephone 112-1) to initiate a session with the other subscriber.

As shown in FIG. 1, gateway 106 acts, through proxy unit 118, as a proxy application server to track calls, for example, within the IMS. When a call request is sent to a subscriber, gateway 106 notifies the associated communication client (e.g., communication client 102-1 or 102-2) of the subscriber, if one exists. This allows a user to forward a call or accept it on either the communication client (e.g., communication client 102-1) or a telephone (e.g., telephone 112-1). If the call is accepted, the user can subsequently terminate it from the communication client. Gateway 106 then sends a BYE request to each party, based on the dialog information that it maintains, through proxy 118.

In exemplary systems, functions previously performed solely by feature servers are divided between feature server 114 and gateway 106. In addition, signaling paths must include both of feature server 114 and gateway 106. This may be accomplished by setting up initial filter criteria. For example, each subscriber may have the following trigger set: (1) ORIGINATING sip:csta_gw.ims.example.com; (2) ORIGINATING sip:fs1.ims.example.com; (3) TERMINATING sip:csta_gw.ims.example.com; and (4) TERMINATING sip:fs1.ims.example.com. Every subscriber has two triggers both in the originating and terminating cases. The triggers point to gateway 106 and the feature server responsible for the subscriber and the order in which the triggers appear may be unimportant. Such a configuration is performed both in the originating and terminating session case because the application servers are typically unable to simultaneously perform all necessary processing on either the originating or terminating side. For example, different subscribers may have different feature servers, so the feature server called in the originating case may not apply any services for the terminating subscriber. Gateway 106 appears in both session cases because if the originating subscriber does not have gateway 106 in its trigger set (because it does not have communication server 104 integration), the processing related to communication server 104 will only be performed if gateway 106 appears in the terminating triggers of the called subscriber.

For invoking services based on uaCSTA requests (e.g., "MakeCall"), gateway 106 acts as an initiating application server. Accordingly, it sends an INFO request containing a uaCSTA body, or an ordinary SIP request, depending on whether the communication device supports uaCSTA, as discussed above. This request should not be processed by the subscriber's filter criteria. Therefore, a special header may be used to direct session control unit 108 to suppress normal message forwarding. This special header may be used by initial filter criteria and each trigger may specify that its condition should only evaluate to true if the header is not present.

In subsequent requests, gateway 106 acts as a proxy (through proxy unit 118), and receives dialog-initiating requests and subsequent mid-dialog requests. For example, upon termination of a call between two subscribers, gateway 106 receives a BYE request to notify a communication client (e.g., communication client 102-1). If the initial filter criteria applies only to initial requests, it may be necessary to ensure that subsequent requests are also received. Application server 116 ensures that it receives subsequent requests by adding a Record-Route header to the request that it receives before forwarding it back to session control unit 108. Alternatively, application server 116 may, upon receiving an initial request, terminate the request and initiate a request toward session control unit 108 that creates a new dialog. In such cases, application server 116 is a back-to-back user agent (B2BUA), rather than a proxy. In some cases, application server 116 acts as a user agent client (UAC) for that new dialog and receives all mid-dialog requests. Accordingly, embodiments including elements from FIG. 1 blend telephony services with IMS networks.

Figure 2:
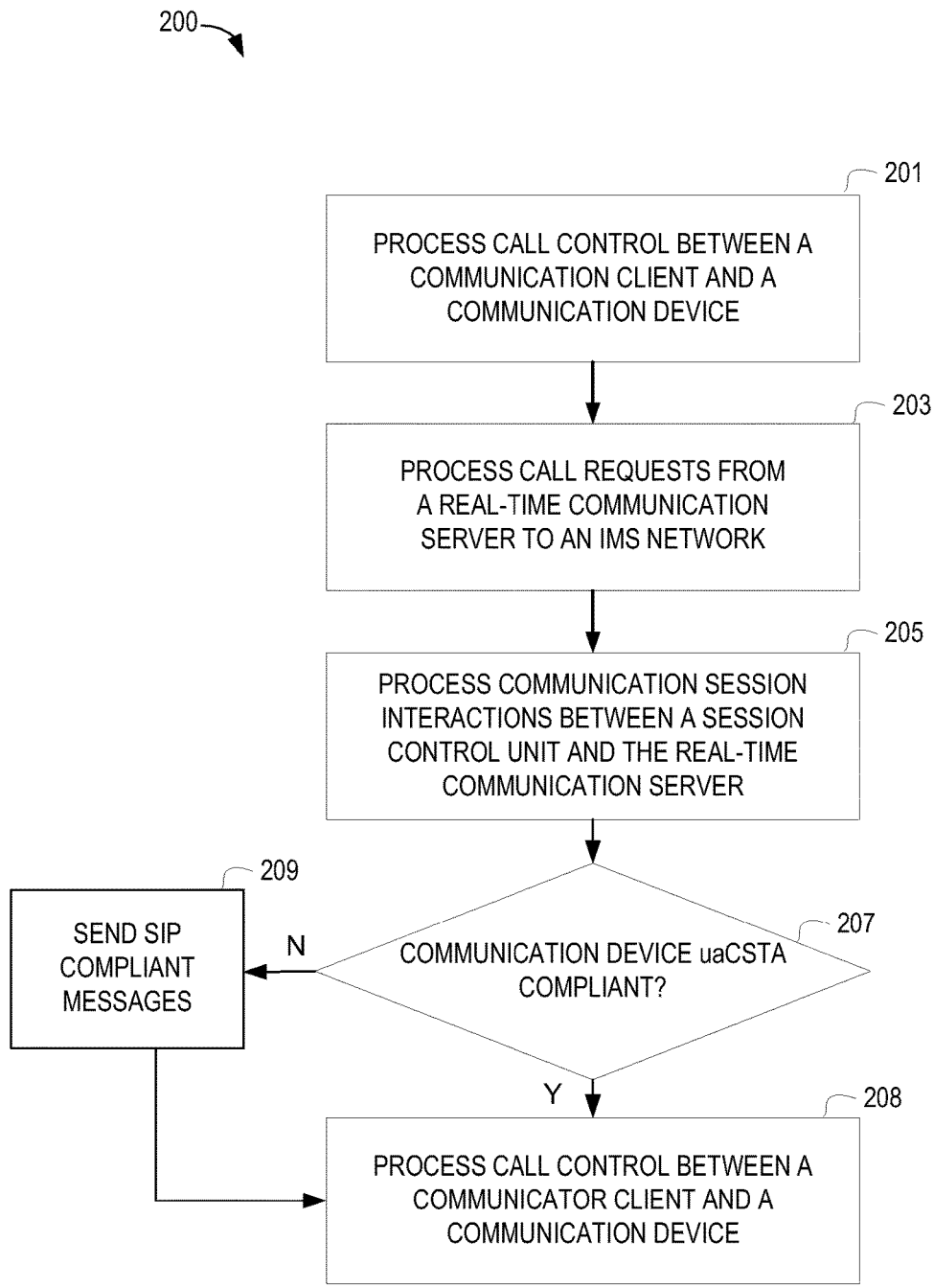
FIG. 2 depicts a methodology that may be employed by the gateway of FIG. 1 to promote blending telephony services provided by the feature server (FIG. 1) with the IMS network (FIG. 1)

FIG. 2 depicts methodology 200 with elements for blending telephony services with an IMS network in accordance with disclosed embodiments. Methodology 200 may be carried out, for example, using gateway 106 (FIG. 1). Call control is processed (block 201) between a communication client (e.g., communication client 102-1 in FIG. 1) and a communication device (e.g., telephone 112-1 in FIG. 1). Call requests from a communication server (communication server 104 in FIG. 1) to an IMS network (IMS network 110 in FIG. 1) are processed (block 203). In turn, communication session interactions are processed (block 205) between a session control unit (e.g., session control unit 108 in FIG. 1) and the real-time communication server (e.g., communication server 104 in FIG. 1). A determination is made (block 207) whether a target communication device is uaCSTA compliant. If the target communication device is not uaCSTA compliant, SIP compliant messages are sent (block 209) to the target communication device. If the target communication device is uaCSTA compliant, call control is processed (block 208) between the communication client and the communication device using uaCSTA compliant messages.

Figure 3:
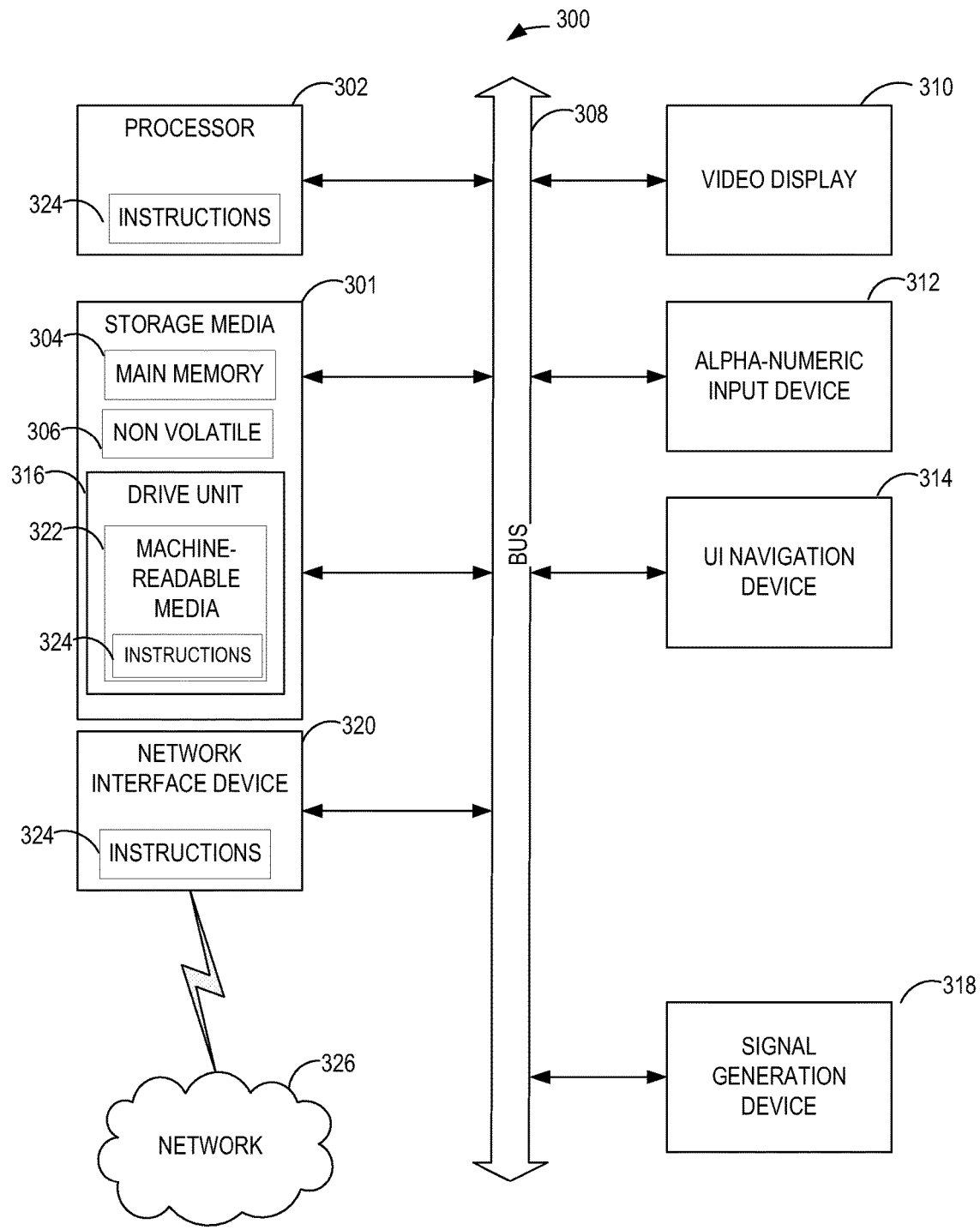
FIG. 3 illustrates a data processing system that may be adapted to perform one or more of the methods, systems, servers, networks, devices, and/or gateways disclosed herein.

FIG. 3 illustrates data processing system 300 which includes a processor 302 (e.g., a central processing unit, a graphics processing unit, or both) that communicates via bus 308 with storage media 301, which includes a main memory 304, a non-volatile memory 306, and a drive unit 316. In some embodiments, main memory 304 and/or the non-volatile memory 306 may be used to store call information, user information, and client information. Data processing system 300 may further include a video display unit 310 (e.g., a liquid crystal display or a cathode ray tube) on which to visually display content provided through a communication client interface, for example. Data processing system 300 also includes an alphanumeric input device 312 (e.g., a keyboard), a user interface (UI) navigation device 314 (e.g., a mouse), a signal generation device 318 (e.g., a speaker) and a network interface device 320. Input device 312 and/or UI navigation device 314 may include a processor (not shown), and a memory (not shown). As shown, the drive unit 316 includes a magnetic or solid state machine-readable medium 322 that may have stored thereon one or more sets of instructions 324 and data structures (not depicted) embodying or utilized by any one or more of the methodologies, systems, functions, servers, or gateways described herein. The instructions 324 may also reside, completely or at least partially, within the main memory 304, within non-volatile memory 306, within network interface device 320, and/or within processor 302 during execution thereof by the data processing system 300.

Instructions 324 may be transmitted or received over a network 326 via the network interface device 320 utilizing any of a number of transfer protocols (e.g., hypertext transfer protocol (HTTP)). While the machine-readable medium 322 is depicted as a single medium, the term "tangible machine-readable medium" should be taken to include a single medium or multiple media (e.g., a centralized or distributed database, and/or associated caches and servers) that store the one or more sets of instructions. The term "tangible machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding, or carrying data structures utilized by or associated with such a set of instructions. The term "tangible machine-readable medium" shall accordingly be taken to include, but not be limited to, solid-state memories, optical media and magnetic media.

In accordance with the disclosed embodiments, instructions 324 support integration between an IMS network and at least one call feature supported by a communication server, and support integration between the IMS network and call features supported by one or more feature servers. Instructions 324 include instructions for involving a plurality of call control services between a communication client and a communication device, processing communication session interactions between the communication server and a session control unit and exchange IMS session control messages between the session control unit and the communication server. Accordingly, data processing system 300 may embody a gateway (e.g., gateway 106 from FIG. 1) that functions as an IMS application server and a proxy server.

Figure 4:
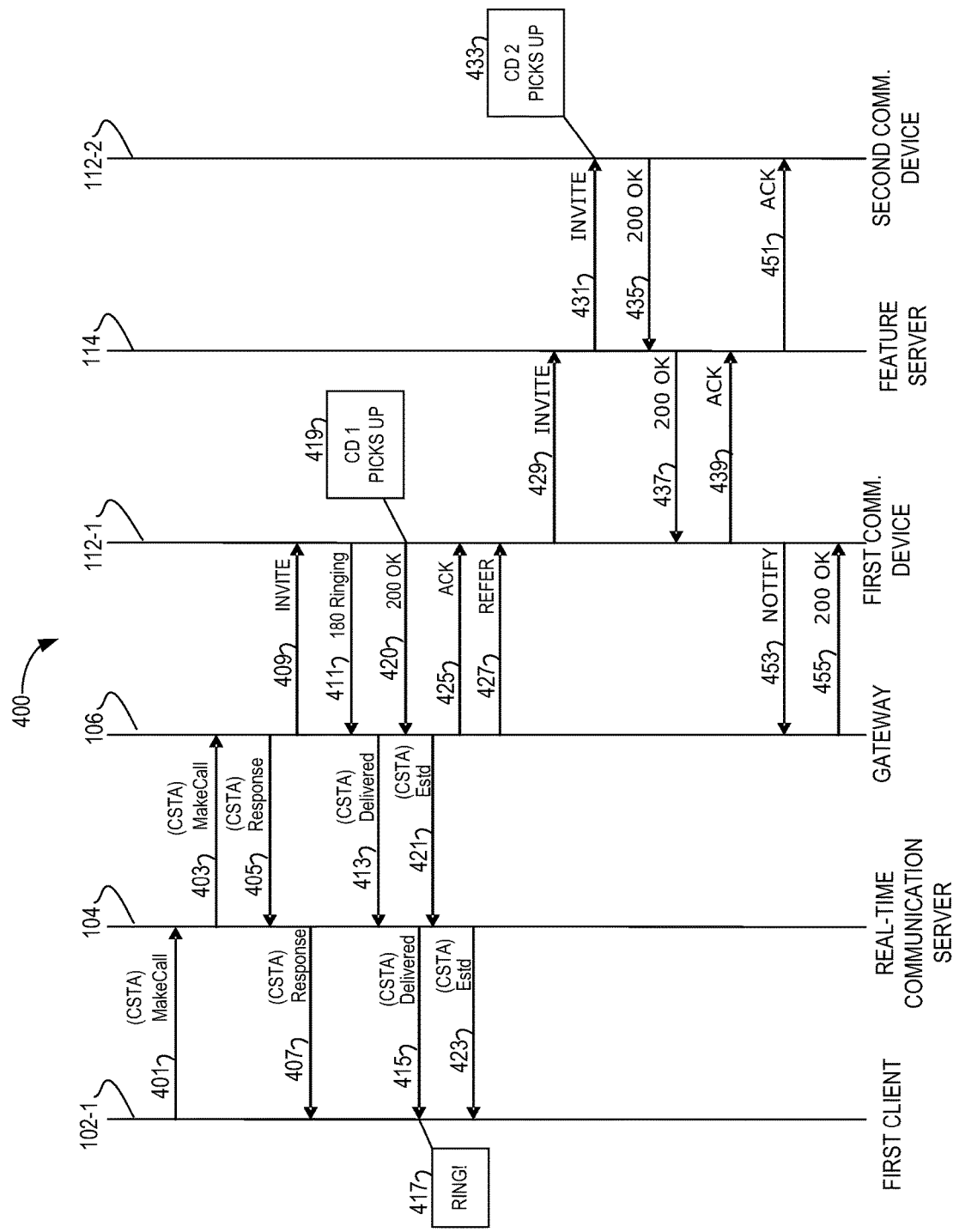
FIG. 4 depicts representative call flow elements in an embodied system that uses the gateway of FIG. 1.

FIG. 4 illustrates call flow 400 for disclosed embodiments that employ a generic gateway such as gateway 106 (FIG. 1). As shown, communication client 102-1 sends a CSTA MakeCall signal 401 to communication server 104, which forwards CSTA MakeCall signal 403 (which is identical to or similar to CSTA MakeCall signal 401) to gateway 106. Gateway 106 sends CSTA response signal 405 to communication server 104, which sends CSTA response signal 407 (which is identical to or similar to CSTA response signal 405) to communication client 102-1. Gateway 106 sends invite signal 409 to communication device 112-1, which may be a telephone. Communication device 112-1 responds with ringing signal 411 to gateway 106. Gateway 106 sends CSTA Delivered signal 413 to communication server 104, which in turn sends CSTA Delivered signal 415 to communication client 102-1. Communication client 102-1 provides ringing indication 417.

If communication device 112-1 is answered, as indicated by box 419, communication device 112-1 sends OK signal 420 to gateway 106. Gateway 106 sends CSTA Established signal 421 to communication server 104, which forwards the signal as CSTA Established signal 423 to communication client 102-1. Gateway 106 sends Acknowledgment signal 425 and Refer signal 427 to communication device 112-1. In turn, communication device 112-1 sends Invite signal 429 to feature server 114, which forwards the signal as Invite signal 431 to communication device 112-2. As depicted in more detail in FIG. 5, messages sent between communication device 112-1 and feature server 114 may be proxied through S-CSCF 541, rather than being sent directly from communication device 112-1 to feature server 114. Communication device 112-2 (e.g., a telephone) picks up as indicated by box 433. Communication device 112-2 sends OK signal 435 through feature server 114 and the signal is forwarded on to communication device 112-1 as OK signal 437. Communication device 112-1 responds with Acknowledgement signal 439 to feature server 114, and the signal is forwarded as Acknowledgement signal 451 to communication device 112-2. Communication device 112-1 sends Notify signal 453 to gateway 106, which responds with OK signal 455 to communication device 112-1.

Figure 5:
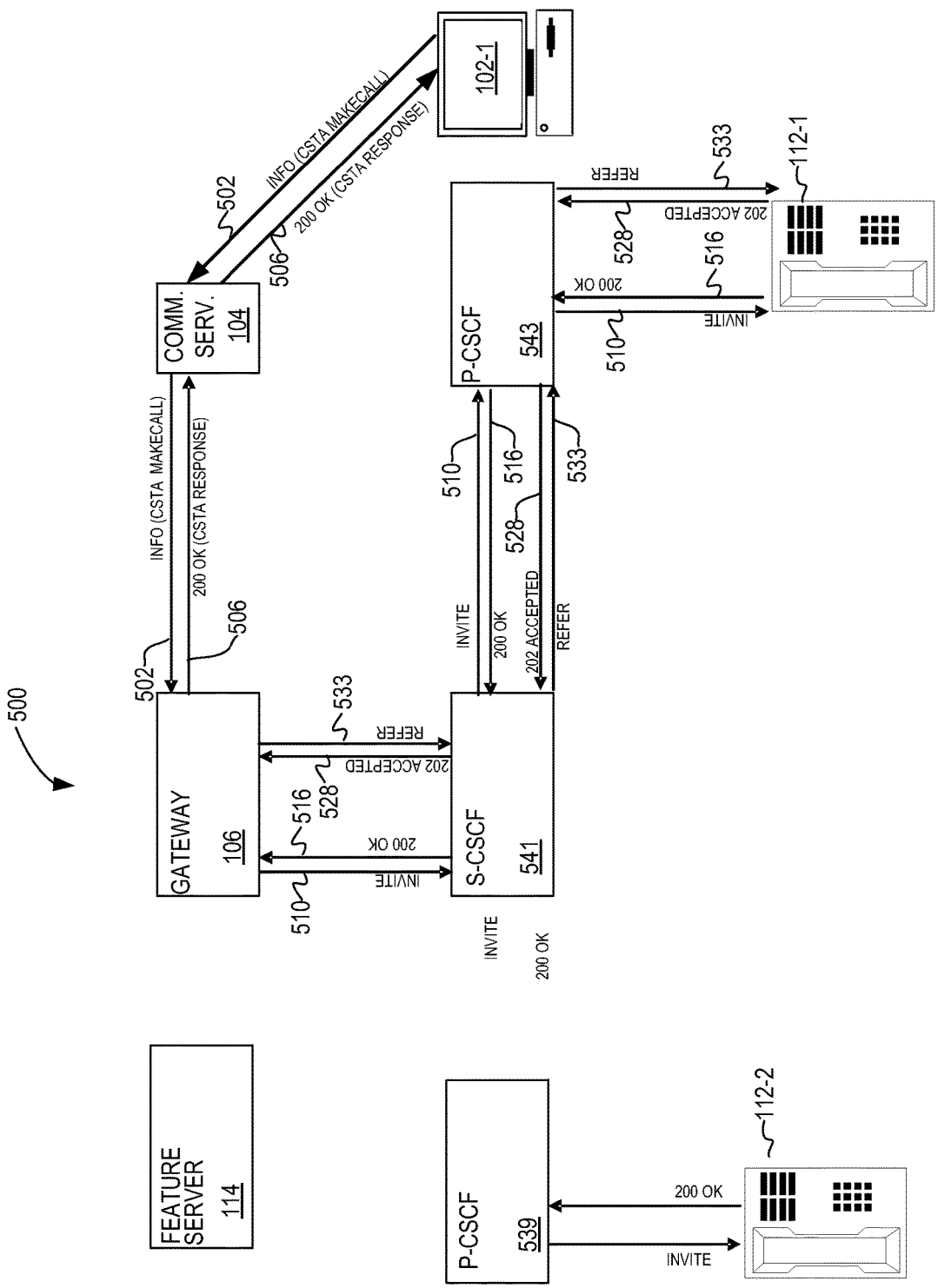
FIG. 5 illustrates representative call flow elements between a communication client and a telephone through a communication server and an embodied gateway.
Figure 6:
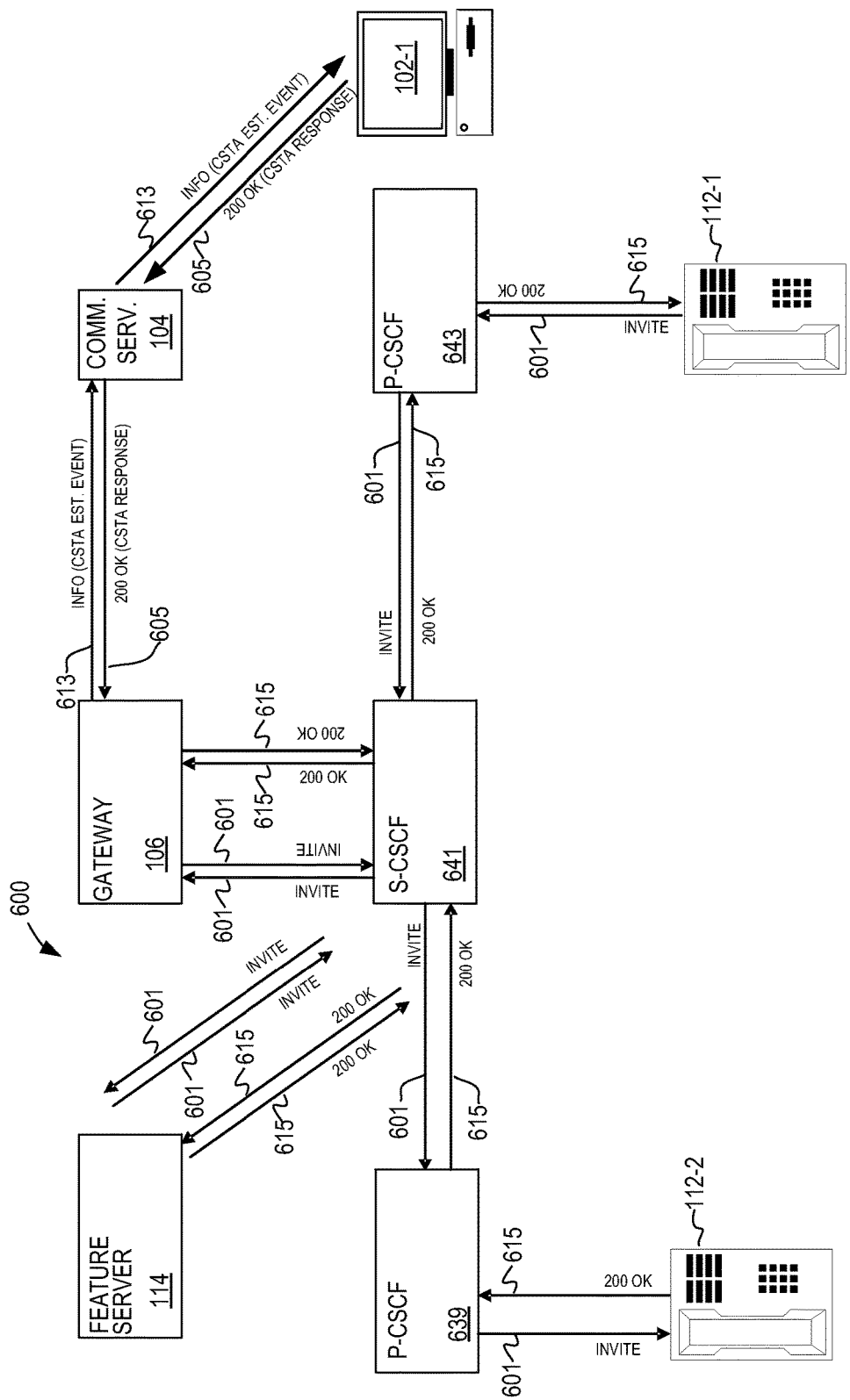
FIG. 6 illustrates further call flow elements for communication and call set up between two telephones through an embodied gateway.

FIG. 5 and FIG. 6 depict a sample call flow for a click-to-call feature in a communication client (e.g., Communicator), for a user of telephone 112-1 and communication client 102-1 to call the user of telephone 112-2. For clarity, the call flow is divided into two figures, with FIG. 5 showing the initial service invocation by a disclosed gateway (e.g., gateway 106), up to and including the REFER request, and FIG. 6 showing the routing of the call establishing the INVITE request from the user of communication client 102-1 and telephone 112-1. For clarity, many messages, such as provisional responses and ACK requests, are not depicted in FIGS. 5 and 6.

FIG. 5 illustrates a sample call flow 500 for a MakeCall request in which a disclosed gateway (e.g., gateway 106) translates the uaCSTA MakeCall request into SIP signaling. When a first user (e.g., a user of communication client 102-1 and telephone 112-1) initiates call service from communication client 102-1, an INFO request 502 with a uaCSTA MakeCall body is sent through communication server 104 (e.g., LCS) to gateway 106, which, as shown, is a disclosed generic CSTA/IMS gateway. In turn, gateway 106, aware that telephone 112-1 does not support CSTA messages, translates messages as necessary into the appropriate SIP messages and adds IMS headers, typically to all requests. Response 506, which indicates a successful request, is sent from gateway 106 through communication server 104 to communication client 102-1. In turn, a dialog is established between gateway 106 and telephone 112-1 with INVITE request 510 which, as shown, is relayed through S-CSCF 541 and Proxy-Call Session Control Function (P-CSCF) 543 to telephone 112-1. Response 516, which indicates a successful request, is sent from telephone 112-1 through P-CSCF 543 and S-CSCF 541, to gateway 106. Following this, REFER request 533 is sent to telephone 112-1 through S-CSCF 541 and P-CSCF 543 to direct it to the destination, which is telephone 112-2. The REFER request 533 is indicated as accepted using response 528, which is routed through P-CSCF 543 and S-CSCF 541 to gateway 106. As shown, response 528 may be a HTTP "202 ACCEPTED" code and, similarly, response 506 may be a "200 OK" code.

FIG. 6 illustrates the routing of a subsequent INVITE request 601 sent by telephone 112-1. In FIG. 6, for clarity, users of both telephones 112 have only originating triggers configured, which may be problematic in practice since it may reduce the number of forwarded messages sent by S-CSCF 641. As shown, telephone 112-1 sends INVITE request 601 to telephone 112-2. In turn, INVITE request 601 is routed through P-CSCF 643, S-CSCF 641, gateway 106, feature server 114, back through S-CSCF 641, through P-CSCF 639 and on to telephone 112-2. When each of gateway 106 and feature server 114 receives INVITE request 601, it forwards the INVITE request 601 back to S-CSCF 641. If the users of telephone 112-1 and telephone 112-2 have both originating and terminating triggers configured, this sequence is repeated. As shown, OK response signal 615 travels along the same route that INVITE request 601 traveled, in reverse order, to telephone 112-1. When gateway 106 receives OK response signal 615, it sends signal 613 (i.e., a uaCSTA EstablishedEvent signal) to communicator client 102-1 to inform communicator client 102-1 that the call has been successfully set up. In turn, communicator client 102-1 sends OK response signal 605 through communication server 104 to gateway 106.

FIG. 6 illustrates INVITE request 601, that is subsequent to the MakeCall request 502 from FIG. 5, that is sent from telephone 112-1 to telephone 112-2, and that is routed through the depicted application servers. As shown, gateway 106 may be implemented as a uaCSTA/IMS gateway with click-to-call functionality using Java and the Java Application Interfaces for Integrated Networks SIP application interface (i.e., JAIN SIP API). Embodied gateways may operate on Ericsson™ IMS platforms, using a Sylantro™ Synergy Feature Server to provide advanced telephony features.

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A system, comprising:
 a processor; and
 a memory device, the memory device storing instructions, the instructions when executed causing the processor to perform operations, the operations comprising:
 receiving a request for a call, the request identifying an origination address and a destination address;
 sending a message to the destination address, the message requesting a protocol supported by a device receiving the call;
 receiving a response from the device, the response identifying the protocol;
 generating a modified request for the call according to the protocol identified in the response; and
 routing the modified request for the call to a session control unit of an Internet protocol multimedia subsystem network.

2. The system of claim 1, wherein the operations further comprise determining from the response that the device fails to support a user agent Computer Supported Telecommunications Applications protocol.

3. The system of claim 2, wherein the operations further comprise translating the message in the user agent Computer Supported Telecommunications Applications protocol into a translated message in a session initiation protocol.

4. The system of claim 3, wherein the operations further comprise adding a header to the message prior to sending the message to the session control unit.

5. The system of claim 1, wherein the operations further comprise establishing a pair of trigger addresses associated with the origination address, wherein one trigger address of the pair of trigger addresses is associated with a gateway and another trigger address of the pair of trigger addresses is associated with a server.

6. The system of claim 1, wherein the operations further comprise establishing a pair of triggers associated with the destination address, wherein one trigger of the pair of triggers is associated with a gateway and another trigger of the pair of triggers is associated with a server.

7. The system of claim 1, wherein the operations further comprise translating the request for the call from a user agent Computer Supported Telecommunications Applications protocol into a session initiation protocol.

8. A method, comprising:
 receiving, by a gateway, a request for a call, the request identifying an origination address and a destination address associated with the call;
 sending, from the gateway, a message to the destination address, the message requesting a protocol associated with the call;
 receiving, by the gateway, a response from the destination address, the response identifying the protocol associated with the call;
 generating, by the gateway, a modified request for the call according to the protocol identified in the response; and
 routing, by the gateway, the modified request for the call to an address of a session control unit of an Internet protocol multimedia subsystem network.

9. The method of claim 8, further comprising determining a client device associated with the destination address fails to support a user agent Computer Supported Telecommunications Applications protocol.

10. The method of claim 9, further comprising translating the message in the user agent Computer Supported Telecommunications Applications protocol into a translated message in a session initiation protocol.

11. The method of claim 10, further comprising adding a header to the message prior to sending the message to the session control unit.

12. The method of claim 8, further comprising establishing a pair of trigger addresses associated with the origination address, wherein one trigger address of the pair of trigger addresses is associated with the gateway and another trigger address of the pair of trigger addresses is associated with a server.

13. The method of claim 8, further comprising establishing a pair of triggers associated with the destination address, wherein one trigger of the pair of triggers is associated with the gateway and another trigger of the pair of triggers is associated with a server.

14. The method of claim 8, further comprising translating the request for the call from a user agent Computer Supported Telecommunications Applications protocol into a session initiation protocol.

15. A memory device storing instructions that when executed cause a processor to perform operations, the operations comprising:
 receiving a request for a call, the request identifying an origination address and a destination address associated with the call;
 sending a message to the destination address requesting a protocol associated with the call;
 receiving a response from the destination address, the response identifying the protocol associated with the call;
 generating a modified request for the call according to the protocol identified in the response; and routing the modified request for the call to an address of a session control unit of an Internet protocol multimedia subsystem network.

16. The memory device of claim 15, wherein the operations further comprise determining a client device associated with the destination address fails to support a user agent Computer Supported Telecommunications Applications protocol.

17. The memory device of claim 16, wherein the operations further comprise translating the message in the user agent Computer Supported Telecommunications Applications protocol into a translated message in a session initiation protocol.

18. The memory device of claim 17, wherein the operations further comprise adding a header to the message prior to sending the message to the session control unit.

19. The memory device of claim 15, wherein the operations further comprise establishing a pair of trigger addresses associated with the origination address, wherein one trigger address of the pair of trigger addresses is associated with a gateway and another trigger address of the pair of trigger addresses is associated with a server.

20. The memory device of claim 15, wherein the operations further comprise establishing a pair of triggers associated with the destination address, wherein one trigger of the pair of triggers is associated with a gateway and another trigger of the pair of triggers is associated with a server.

* * * * *